Feb. 25, 1941. E. D. PATTERSON 2,233,223
TEST PLUG
Filed March 11, 1938 2 Sheets-Sheet 1

Inventor
Elam D. Patterson.
By Ambs, Thiess, Olson & Mecklenburger
Attys.

Feb. 25, 1941. E. D. PATTERSON 2,233,223
TEST PLUG
Filed March 11, 1938 2 Sheets-Sheet 2
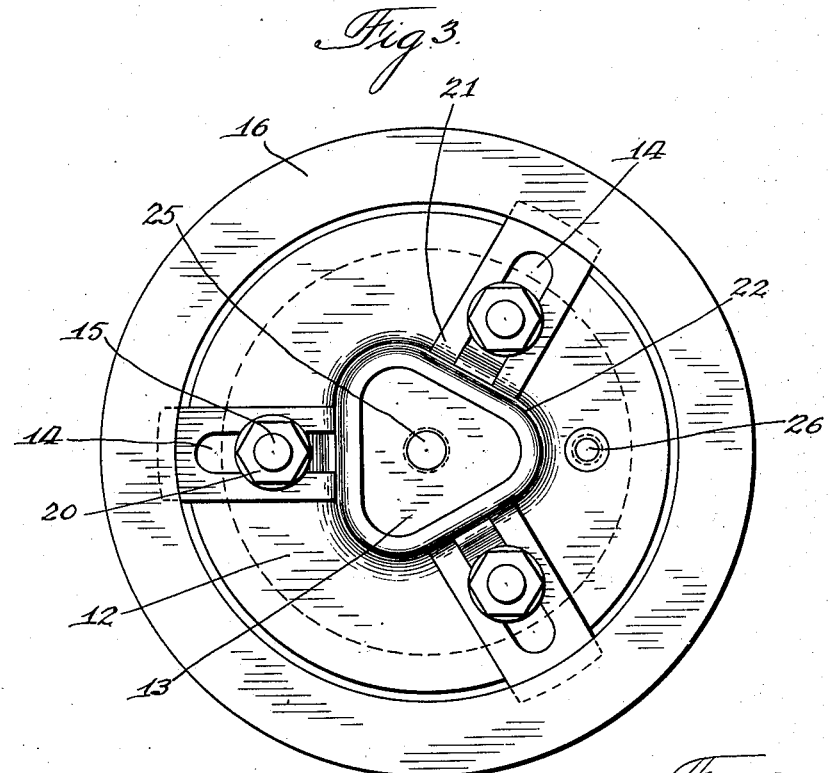
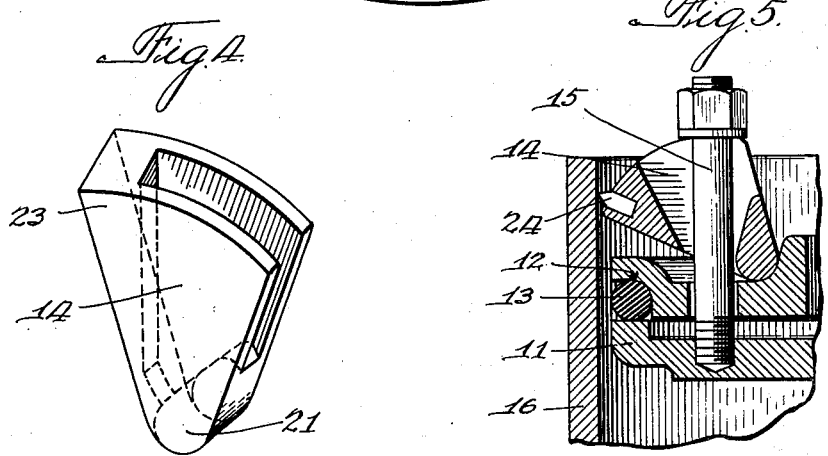
Inventor:
Elam D. Patterson
By Ames, Thiess, Olson & Mecklenburger
Attys.

Patented Feb. 25, 1941

2,233,223

UNITED STATES PATENT OFFICE 2,233,223

TEST PLUG

Elam D. Patterson, Coshocton, Ohio, assignor to James B. Clow & Sons, Chicago, Ill., a corporation of Illinois Application March 11, 1938, Serial No. 195,249

2 Claims. (Cl. 220—25)

This invention relates to a test plug, more specifically to a test plug for closing ends of conduits, pipes, cylinders, and the like, and has for one object the provision of a test plug suitable for closing the ends of conduits, even though the latter are truly cylindrical, and which will withstand high pressures.

It is often desirable to test pipe lines, water mains, sprinkling systems, gas lines, and the like, at pressures somewhat higher than that to which such systems will be subjected under normal operating conditions. In making such tests, it becomes necessary to seal the ends of large pipes or conduits which are not threaded and consequently not adaptable for the insertion of the ordinary screw type plug. On the other hand, some type of plug is desirable that will be capable of withstanding high pressures. Several types of test plugs have been previously suggested, but they have been unwieldy and, for the most part, difficult to attach and to remove from the open end of the pipe in the system to be tested.

Accordingly, among the objects of this invention is the provision of a simplified test plug which may be readily installed and removed from the open end of a pipe; for instance, a test plug which may be readily installed in the open end of an unthreaded pipe or of plain cylinders (true cylinders) and wherewith it is not necessary to embrace the outer edges of the ends of the pipe.

Further and additional objects of this invention will appear from the following description, in which:

Fig. 3 is the top view of the test plug and pipe end of Fig. 1;

Fig. 4 is a perspective view of one form of latch used in the test plug of the invention; and Fig. 5 shows a construction whereby the test plug of this invention may be used in an open cylinder or a pipe which is not provided with a lead groove or lip under which the latch may engage, i. e., a truly cylindrical pipe or conduit.

The test plug of this invention comprises a pressure disc or closure member which may be inserted into the open end of a bell pipe or cylinder. Another pressure member or pressure ring adapted to co-operate with the first-mentioned member is also capable of being inserted into the open end of the pipe. For convenience, these two rings or discs may be referred to as the "lower" and "upper" pressure members, although it is, of course, realized that the conduit in which the plug is placed usually extends horizontally and that these terms are not, therefore, strictly accurate.

A sealing element is interposed between the said two members. The sealing element is capable of firmly engaging the side walls of the pipe when the closure member and the pressure member are secured tightly together. The two upper and lower members are secured together and held in place within the end of the pipe by means of a suitable latch which engages the inner walls of the pipe in a manner such that the test plug is held firmly therein.

For a more complete understanding of this invention, it is desirable to give a detailed description of a specific embodiment thereof. It is to be observed, however, that the example given is merely for illustrative purposes and the invention is not to be limited thereby.

Figure 1:
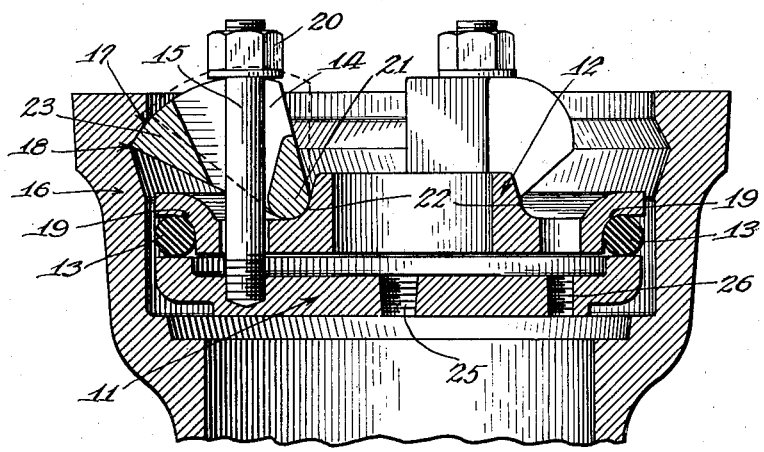
Figure 1 is an elevational view, partially in section, of one form of the invention as it appears just after it has been inserted loosely into the open end of an ordinary bell pipe.

Referring now to Fig. 1, the test plug comprises a disc-like closure member 11 adapted to be co-operatively associated with a similarly shaped pressure member 12. A sealing element 13 is positioned between the lips of members 11 and 12. A plurality of latches 14 and a means, or means, such as a bolt, or bolts, 15 are co-operatively movable to cause the latches to engage the inner walls of a bell pipe 16 or under the lip 17 of the lead groove 18 of the pipe.

The sealing element 13 is preferably a gasket of some resilient material such as rubber which is interposable between the closure member 11 and the pressure member 12 and adapted firmly to engage the side walls of pipe 16 when a force is exerted pressing the closure member 11 and pressure member 12 tightly together, i. e., raising the "lower" member 11 up against the "upper" member 12. A shoulder 19 is provided on the pressure member 12 to compress and push the sealing element 13 outwardly against the inside wall of pipe 16. This shoulder effectively prevents the gasket from expanding inwardly as compressive force is exerted between closure member 11 and pressure member 12.

Figure 2:
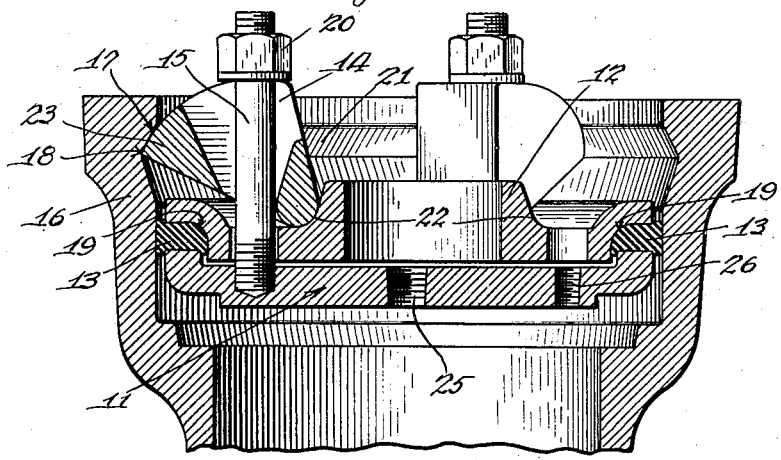
Fig. 2 is a view similar to Fig. 1 but wherein the plug is shown as securely fastened into the end of the pipe (with the resultant pressure sealing of said pipe)

Bolt 15 is threadedly secured to closure member 11 and passes through the latch 14 in such manner that nut 20 thereon bears against the upper part of said latch to draw said member 11 upward, when said nut is tightened, against the pressure member 12 (see Fig. 2). This forces pressure member 12 and the closure member 11 together, thereby firmly pressing sealing member 13 outwardly against the sides of pipe 16 (see Fig. 2). The bolt 15 engages latch 14 by passing through an opening within latch 14, which opening is so constructed that the latch 14 may rotate to a limited extent on its apex 21 in the same plane as the long axis of bolt 15. The apex 21 preferably rests in a suitable groove or against a suitable shoulder 22 in pressure member 12 in order that the latch 14 may be progressively more firmly engaged between the lip 17 and the pressure member 12 as the nut 20 is tightened.

The latch 14 may be of any desired shape, but in the preferred embodiment of this invention it is shown as wing- or wedge-shaped (Fig. 4). The length of the side of the wing extending from the apex 21 to the conduit-engaging portion 23 is preferably greater than the length of the opposite side. Consequently, when the latch 14 is engaged with the side walls of pipe 16, it will be locked in place by tightening nut 20. As is shown in Fig. 2, when the test plug is tightened down by the nuts 20, the sealing element 13 is firmly pressed against the side walls of pipe 16, and the latches 14 are engaged with the lead groove 18 in bell pipe 16, thus preventing the test plug from being forced out even when considerable pressure exists in a conduit system to which the bell pipe may be connected.

The shoulder 22 on pressure member 12 is preferably formed, when viewed in plan (see Fig. 3), with as many sides as there are bolts; in the illustrated form, there being three bolts, it has a triangular contour. Contact of the full width of apex 21 of latch 14 with the shoulder 22 is thus provided.

Fig. 5 shows a variation of the construction of a latch to be used as taught by this invention and which comprises a suitable edged steel insert 24 which may be fastened in any desirable manner to the latch 14. A latch of this construction is useful for enabling one to insert the test plug into an open cylinder or pipe which does not embody a suitable groove 18 in pipe 16 for engaging the latches as shown in Fig. 1.

The plug of Fig. 5 is installed similarly to that shown in Figs. 1 and 2; the steel inserts 24 in the wedges "bite into" the inside of the pipe, thereby to form fixed abutments co-operating with the bolts 15 and nuts 20 to draw the member 11 up against the member 12 and seal the end of the conduit; in short, the inserts subserve the same function with respect to the wedges as does the lip of the lead groove in the pipe of Figs. 1 and 2.

The closure member 11 may, in either case, if desired, be equipped with taps 25 and 26 indicated in Fig. 1. Such taps are preferably threaded and may be used for attaching pressure pipes or air escape valves to the test plug.

While but two particular embodiments of this invention are shown above, it will be understood, of course, that the invention is not to be limited thereto since many modifications may be made, and it is contemplated, therefore, to cover any such modifications as fall within the true spirit and scope of this invention as defined by the appended claims.

I claim:

1. A test plug for conduits and the like having a circumferentially extending lip positioned on the inside surface walls thereof, said plug comprising a closure member, a pressure member, a sealing means between said members, a substantially wing-shaped latch positioned in the plane of the diameter of a conduit, the apex of said latch adapted to engage a central portion of said pressure member in pivotal relationship and one of the opposite corners or edges of said latch adapted to engage the inner side walls of the conduit under said lip, and an adjustable means extending through said latch and co-operating with said latch and said closure member to lock said latch to retain said plug and simultaneously compress said sealing member.

2. A test plug for conduits or the like comprising a closure member, a pressure member adjacent said closure member, sealing means between said members, a plurality of wing shaped latches having slots extending therethrough, means carried by said closure member and extending through said pressure member and said slots for positioning said latches in planes substantially at right angles to said members with the apex of each latch engaging said pressure member, said latches being so positioned that an opposite edge or corner of each latch is adapted to engage the inside walls of the conduit, and means including said positioning means for individually exerting forces on each latch to cause said latch to rotate about its apex in a plane extending radially of the conduit and wedge between said pressure member and said conduit, said last mentioned means upon individual operation to rotate said latches being adapted to exert individual forces on said pressure member to cause said sealing member to engage the walls of said conduit in sealing relation.

ELAM D. PATTERSON.